United States Patent [19]
Hess et al.

[11] Patent Number: 5,380,147
[45] Date of Patent: Jan. 10, 1995

[54] DEVICE FOR PICKING UP BENDABLE FLAT PARTS

[75] Inventors: Frank-Jurgen Hess, Kierspe; Torsten Schreiber, Dortmund; Frank Wollboldt, Iserlohn, all of Germany

[73] Assignee: Fraunhofer Gesellschaft Zur Forderung Der Angewandten Forschung e.v., Munich, Germany

[21] Appl. No.: 915,444

[22] Filed: Jul. 17, 1992

[30] Foreign Application Priority Data

Jul. 19, 1991 [DE] Germany ............... 4124077

[51] Int. Cl.6 ............................... B65G 59/02
[52] U.S. Cl. .................. 414/796; 414/796.9; 414/907
[58] Field of Search ............ 414/796, 796.9, 622, 414/626, 907

[56] References Cited

U.S. PATENT DOCUMENTS

| 4,861,227 | 8/1989 | Cinotti ................. 414/796 X |
| 4,911,608 | 3/1990 | Krappitz et al. ............. 414/796 |
| 5,040,942 | 8/1991 | Brinker et al. ............. 414/796 |
| 5,102,293 | 4/1992 | Schneider ................. 414/796 |
| 5,107,085 | 5/1991 | Ishikawa ............. 414/796.8 X |
| 5,169,284 | 12/1992 | Berger et al. ............. 414/796.9 |

FOREIGN PATENT DOCUMENTS

| 0363722 | 4/1990 | European Pat. Off. . |
| 3641434 | 6/1988 | Germany . |
| 3835032 | 4/1990 | Germany . |

*Primary Examiner*—Michael S. Huppert
*Assistant Examiner*—Janice L. Krizek
*Attorney, Agent, or Firm*—Weingarten, Schurgin, Gagnebin & Hayes

[57] ABSTRACT

A device for lifting one or more flexible, flat parts such as stacked paper, pasteboard, cardboard, plastic is disclosed. The device relies on the propensity of a bundle of such parts to flex up around its edge when compressed at a point away from that edge. In one embodiment, a compression device presses down on one bundle in a stack of several bundles of parts to be lifted and a second compression device presses down the underlying stack, thus opening up a gap between the upper bundle and lower stack. A lifting arm is driven into this gap, and a clamp presses down on the bundle above the lifting arm, grasping the bundle. Two retainers are extended down onto the lower stack to prevent the stack from moving as the bundle is lifted. Once contact between the lifted bundle and the remaining stack is broken, the retainers are withdrawn and the lifting device is maneuvered to a delivery position.

3 Claims, 6 Drawing Sheets

DEVICE FOR PICKING UP BENDABLE FLAT PARTS

FIELD OF THE INVENTION

This invention relates generally to material handling equipment, and more particularly, to a device for separating and lifting and/or picking up flexible flat parts, especially bags or bag bundles not bound together.

BACKGROUND OF THE INVENTION

Several devices for depalletting flexible items are known in the prior art. German DE-OS 38 35 032, corresponding to U.S. Pat. No. 5,102,292 discloses a device for destacking blanks of paper, pasteboard, cardboard, plastic, etc. stacked in blocks. The individual blank blocks are lifted from their respective bases by means of a plunging tool, with the plunging tool being supported on a base for exact positioning immediately prior to being inserted into the blank block. When one blank block has been lifted and carried away, the device either travels to a next blank block or the latter is positioned at the point where the one that has just been transported away was located. The plunging tool is formed by a flexible tongue which, during a destacking process, is initially supported on a solid support and must be pivoted relative to its perpendicular direction of motion. In order for the tongue to penetrate more simply between the parts or beneath the blank block, compressed air is blown between the individual parts, forming an engagement gap for the tongue.

In other known devices for depalletting flexible parts, a gripper unit is in the form of a suction gripper. German DE-AS 25 49 264 shows a device for separating stacked bags, with the bags being picked up by a sucker. German DE-OS 37 42 637 describes another device for removing individual empty bags from a pallet. The gripper unit in this device also is made in the form of a sucker. According to German DE-PS 32 42 181, the device is designed so that a plastic bag is lifted in one corner area by suction, then pivoted through approximately 90°, and then lifted off the bag stack beneath. The presence of a suction gripper for picking up a single item is common to all of these devices. However, these devices suffer from an inability to pick up a stack or pick several flexible parts at once.

Devices are also known, for example from German DE-OS 38 05 974 that permit stacks or individual flexible parts to be picked up. This is accomplished by fork tines of a fork lift either underrunning the pallet on which the flexible parts are located or underrunning the flexible parts themselves, and lifting them off the stack located beneath. This solution is especially disadvantageous if the parts are stacked in different stack patterns or if the parts are so shaped that they can snag beneath one another, as for example with valve bags. Picking up open stacks of parts not bound together is not possible since the parts simply slide off the fork tines.

The goal of the present invention is to design a device according to the species in such fashion that with a design advantageous for use, picking up flexible flat parts both individually and in open stacks is possible in a safe and accurate fashion.

This goal is achieved by the invention recited in the main claim. The subclaims show advantageous improvements.

SUMMARY OF THE INVENTION

The present invention discloses a device which is capable of picking up flexible flat parts both individually and in open stacks in a safe and efficient fashion.

The present invention has a gripper unit with a hold-down device which is placed on parts to be lifted and a compression device a compression foot of which is placed positively on parts stacked beneath. This creates an engagement gap for a lifting arm located adjacent to the compression device. The compression device is in a positive pressure relationship with the parts located in the stack beneath during an underrunning process beneath a bundle to be picked up or beneath individual parts to be picked up. Since the parts are flexible, the positive pressure contact means that an engagement gap for the lifting arm is formed. In addition, the lower parts stacked beneath retain their position due to the positive pressure applied by the compression foot of the compression device and its uppermost parts are not disturbed by the lifting process. After the underrunning processing, the parts are gripped between and lifted by a clamp and the lifting arm.

The prerequisite for the formation of the engagement gap is that the flexible parts can be compressed as the compression device is advanced. Depending on the nature of the flexible parts to be picked up, the force with which the compression device compresses the parts can be selected precisely, allowing the proper sizing of the engagement gap. When the compression device is in positive engagement with the lower stack and the engagement gap has been formed, the lifting arm, located proximate to or in the compression device and actively moveable with respect thereto, is flexible and is brought by horizontal movement so its tip is in positive contact with the lower stack just below the parts in the bundle to be lifted. The bundle to be picked up is next underrun by the further horizontal movement of the lifting arm. A clamp is then lowered by extension from a pneumatic cylinder onto the parts to be picked up and compresses them from above and against the lifting arm. If the lifting arm is in the form of an elastic tongue, the tongue is of sufficiently rigid material to allow the bundle to be lifted by it when pressed against it by the extension of the clamp from the pneumatic cylinder. The flexible parts may then be gripped and picked up safely.

According to the invention, one embodiment provides that after the bundle has been picked up, the gripper unit moves along a curve such that relative movement between the gripped parts and the parts on the stack located beneath are not displaced by the motion of the parts that are picked up.

The movement of the gripper depends on the length of the parts to be picked up, since the arc described by the gripper is centered at the end point of the part to be picked up. In addition, this arc depends upon the gripping point on the part and the distance between the end of the part and the middle of the part. It also depends upon the engagement depth and/or the length of the underrunning, and on the flexibility of the material of which the parts are made. If all of these parameters are taken into account, the required arc can be calculated.

According to one especially preferred embodiment of the invention, the flexible lifting arm includes on a far end an elastic, flexible, pretensioned insertion arm or tongue associated with the compression device. The tongue remains proximate to the compression device until an engagement gap is formed by the downward pressure of the compression device into the lower stack. The elastic flexible lifting arm can be made of plastic or metal. It can also be made of thin material and at the end facing the parts to be lifted have a curved shape. This curved shape ensures that the lifting arm, in the retracted position, i.e. while it is proximate to the compression device, is under pretension and when it extends away from the compression device, forms a positive contact to the lower stack below by its relaxation deflection.

Another design for the lifting arm relates to a rigid insertion arm which is elastically mounted. This tongue, in the retracted state, is likewise under pretension but the pretensioning is not produced by the shape and material properties of the insertion arm, as described above but by the action of a spring on the end of the lifting arm. When this insertion arm is extended away from the compression device, the spring relaxes and brings the tongue into positive contact with the parts located beneath. Then by suitable choice of the insertion arm material or the spring constant and a suitable arrangement of the insertion arm and a mounting element, a specified pretensioning of the insertion arm can be applied.

Another advantageous design is provided by fixedly mounting a rigid insertion arm on a mounting element parallel to the clamp. Those elements are then rotatably mounted with a spring interposed so as to provide the desired pretensioning of the insertion arm. This design allows the use of a rigid material that minimizes the wear on a tip area of the lifting arm.

The design of the invention also discloses the use of at least one retainer to hold the rest of the stack. With two or more retainers, one laterally on either side of the bundle, it is possible to hold the part of the stack that is to remain at the moment when the bundle is lifted. This prevents inadvertent removal or displacement of the uppermost part of the lower stack.

In further accord with the invention, the device is equipped with sensors which recognize the stack pattern and determine the gripping point. These sensors can be in the form of ultrasound sensors or optical sensors.

DESCRIPTION OF THE DRAWINGS

The invention will be more fully understood from the following exemplary detailed description provided in conjunction with the accompanying drawings, in which.

DETAILED DESCRIPTION OF THE PREFERRED EMBODIMENTS

Figure 1:
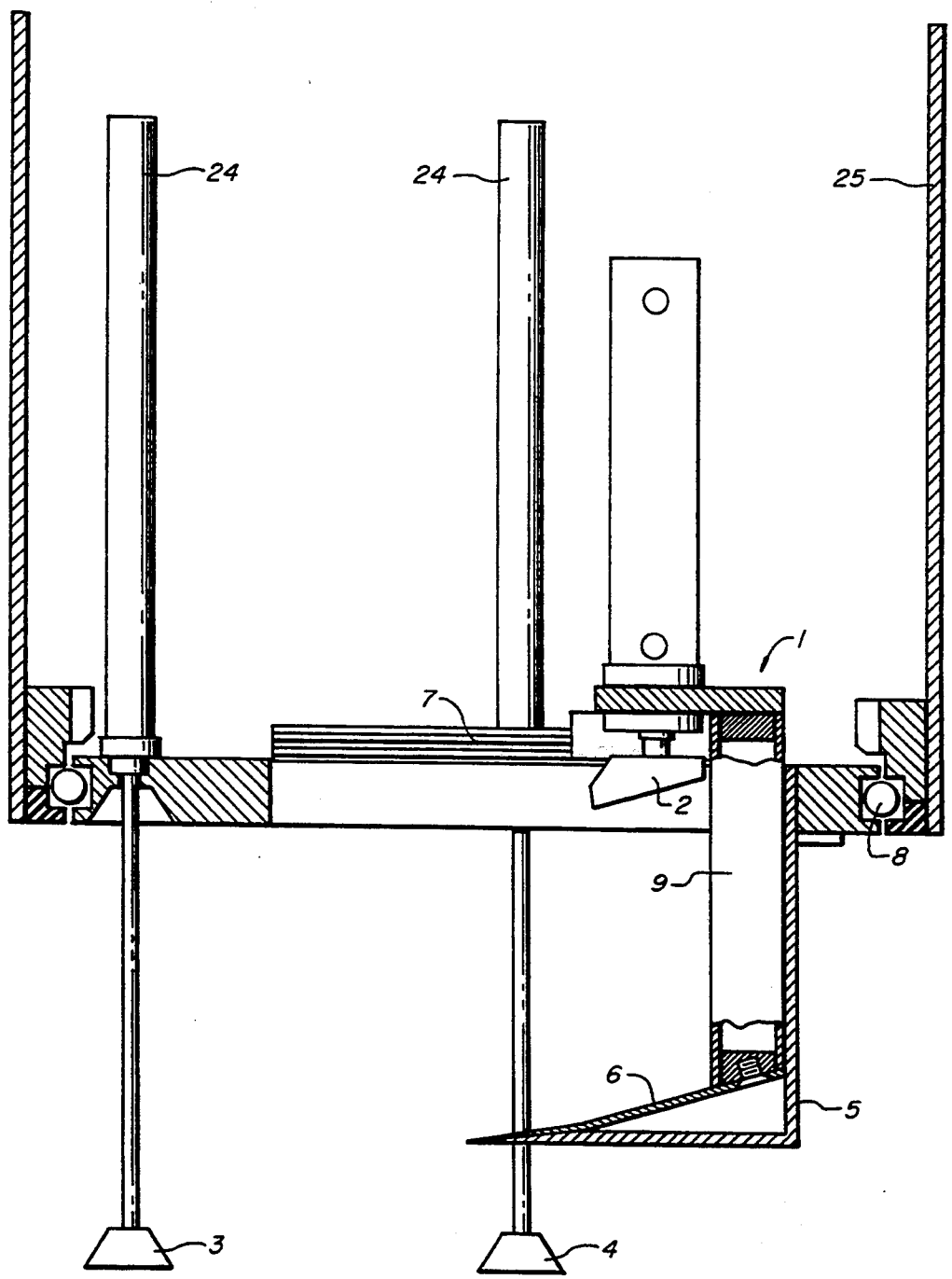
FIG. 1 is a side view of one embodiment of the present invention.

Referring now to the drawings, wherein like reference numerals designate corresponding or similar elements throughout the several views, FIGS. 1–4 illustrate according to the invention an underrunning lifting device, comprised of a gripper unit 1, a pneumatically driven clamp foot 2, a hold-down device 3, one or two retainers 4, and a compression device 5. The gripper unit 1 comprises a lifting arm having an insertion arm or tongue 6 and a positioning element 9 proximate to the compression device 5. Clamp foot 2 cooperates with the insertion arm 6. Gripper unit 1 is movable on a linear track 7 and rotatable around rotation means 8. The hold-down device 3 and retainer(s) 4 are extended by pneumatic cylinders 24 according to the embodiment shown.

Figure 3:
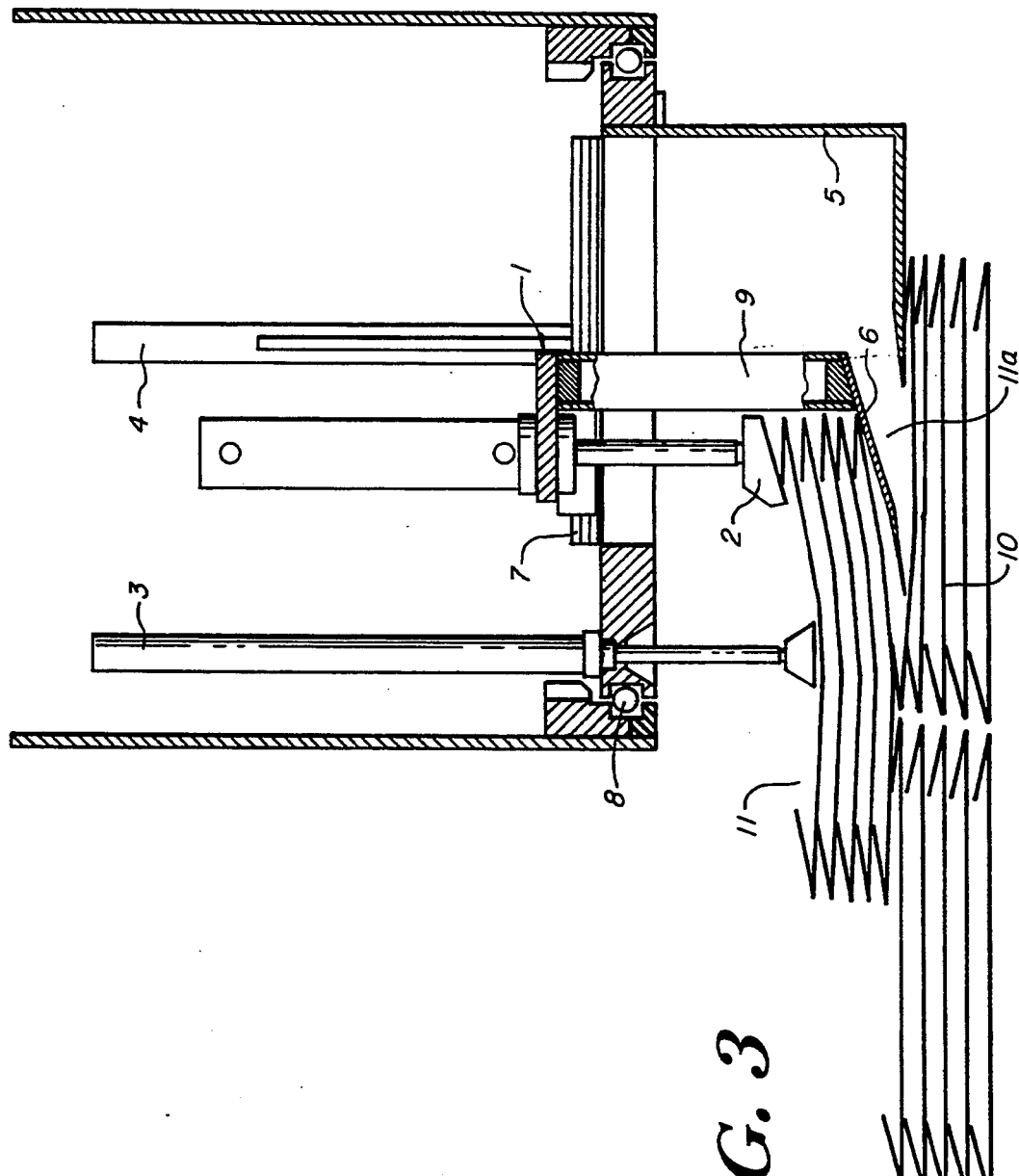
FIG. 3 is a side view of the embodiment of FIG. 1 in which a to be lifted bundle of flat bag parts are being underrun.
Figure 4:
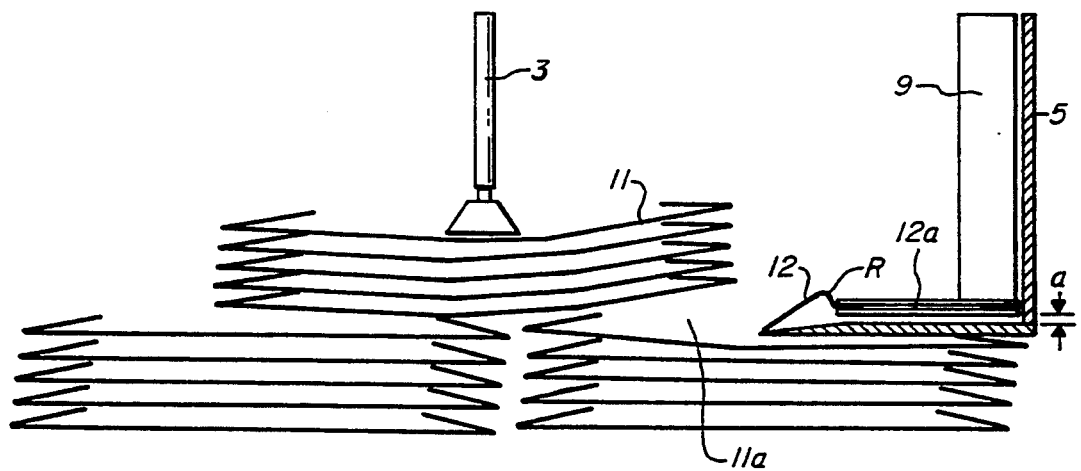
FIG. 4 is a side view of a hold-down device and a compression device extended to create an insertion gap for an elastic insertion arm.

FIGS. 3–4 show an elastic flexible insertion arm 6 which is mounted to be displaceable relative to the compression device 5. Compression device 5 is on a partial stack 10 located beneath a bundle 11 to be lifted. The flexible yielding insertion arm tongue 6, during the lowering process and the process in which an engagement gap 11a is formed, is held proximate to the second compression device 5 under pretension. The pretension depends upon a distance "a" between a clamping area 12a of insertion arm tongue 12 and the inner surface of the compression device 5, the material of the insertion arm 12, and a radius "R" of a tip area arc.

Figure 5:
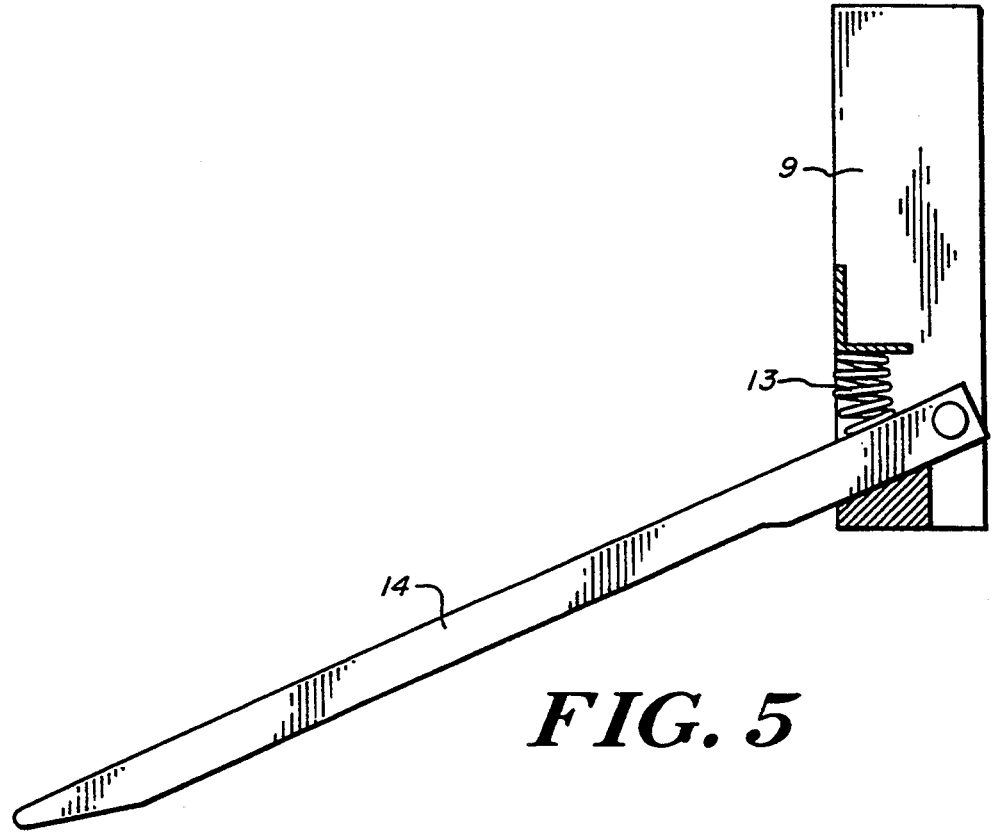
FIG. 5 is a side view of a rigid elastically mounted insertion arm and mounting element.

Another embodiment of a lifting arm is shown in FIG. 5. This is a rigid insertion arm 14 elastically mounted by means of spring 13 in a mounting element 9. The pretensioning of this insertion arm 14 is provided by the choice of the spring pretension and the choice of the spring constant.

Figure 6:
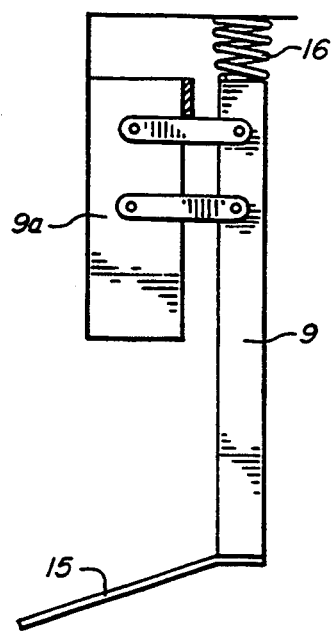
FIG. 6 is a side view of an elastically mounted lifting arm.
Figure 6A:
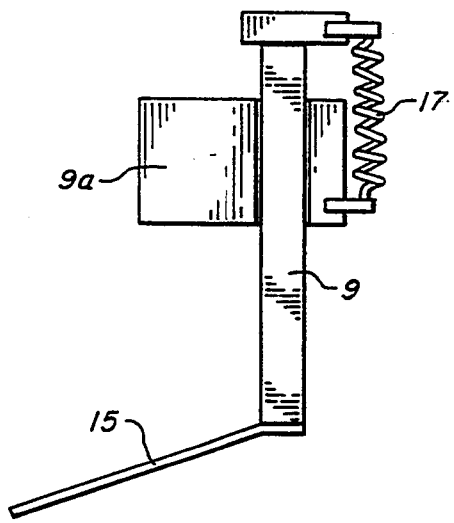
FIG. 6a is a side view of an alternative embodiment of an elastically mounted lifting arm.

FIGS. 6 and 6a show embodiments in which the mounting element 9 and the insertion arm 15 are elastically mounted to a support 9a, with insertion arm 15 itself being rigid and the connection with mounting element 9 being rigid as well. The elastic mounting of the lifting arm is provided either by a compression spring 16 or a tension spring 17 between element 9 and support 9a.

Figure 7:
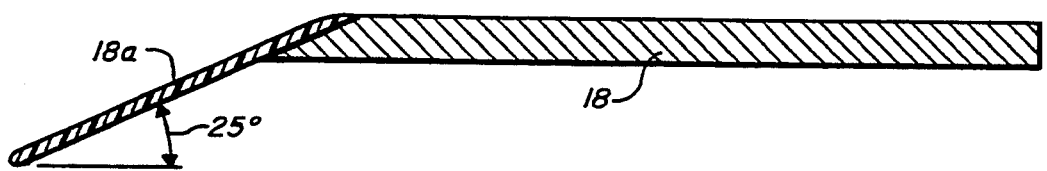
FIG. 7 is a side view of an elastic insertion arm.
Figure 7A:
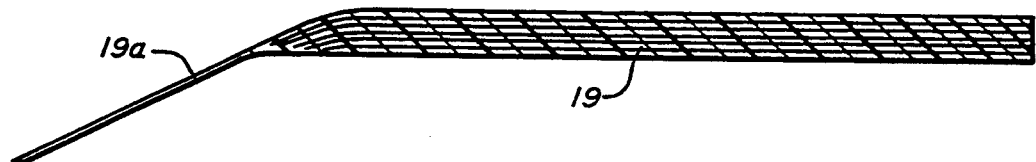
FIG. 7a is a side view of an alternative embodiment of an elastic insertion arm.

Two alternate embodiments of a partially flexible insertion arm 18, 19 are shown in FIGS. 7 and 7a. They correspond to the basic form of insertion arm 12 in FIG. 4. Insertion arm 18 shown in FIG. 7 is made of aluminum in the clamping area and has a beveled PVC insert 18a in a tip area. The beveled insert runs at an angle of 25°. The design of flexible insertion arm 19, shown in FIG. 7a, is similar but this insertion arm 19 is made of fiber-reinforced plastic, with the elastic tip 19a being made of especially thin material. Other tip area angles can be employed, depending on the application.

Figure 8:
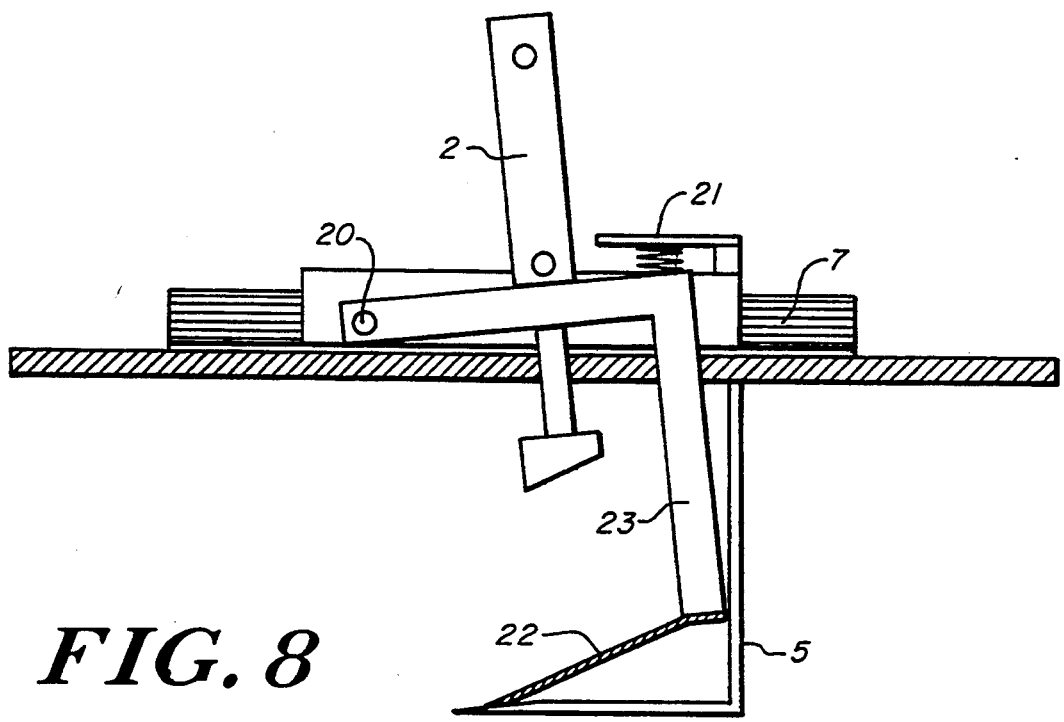
FIG. 8 is a side view of an elastically mounted grippers.

FIG. 8 illustrates a gripper unit 1 in which the insertion arm 22 is rigidly attached to the mounting element or lifting arm 23 as in FIGS. 6 and 6a. However, in FIG. 8, the insertion arm 22 is pretensioned via compression spring 21 acting on the mounting element 23. The mounting element is capable of rotating about pivot point 20. In order to maintain the desired alignment between the insertion arm 22 and the clamp foot 2, the latter is also rigidly attached to the mounting element 23. The entire gripper unit 1 as described is driven along the track 7, facilitating the driving of insertion arm 22 under the bundle 11 to be depalletted.

Figure 2:
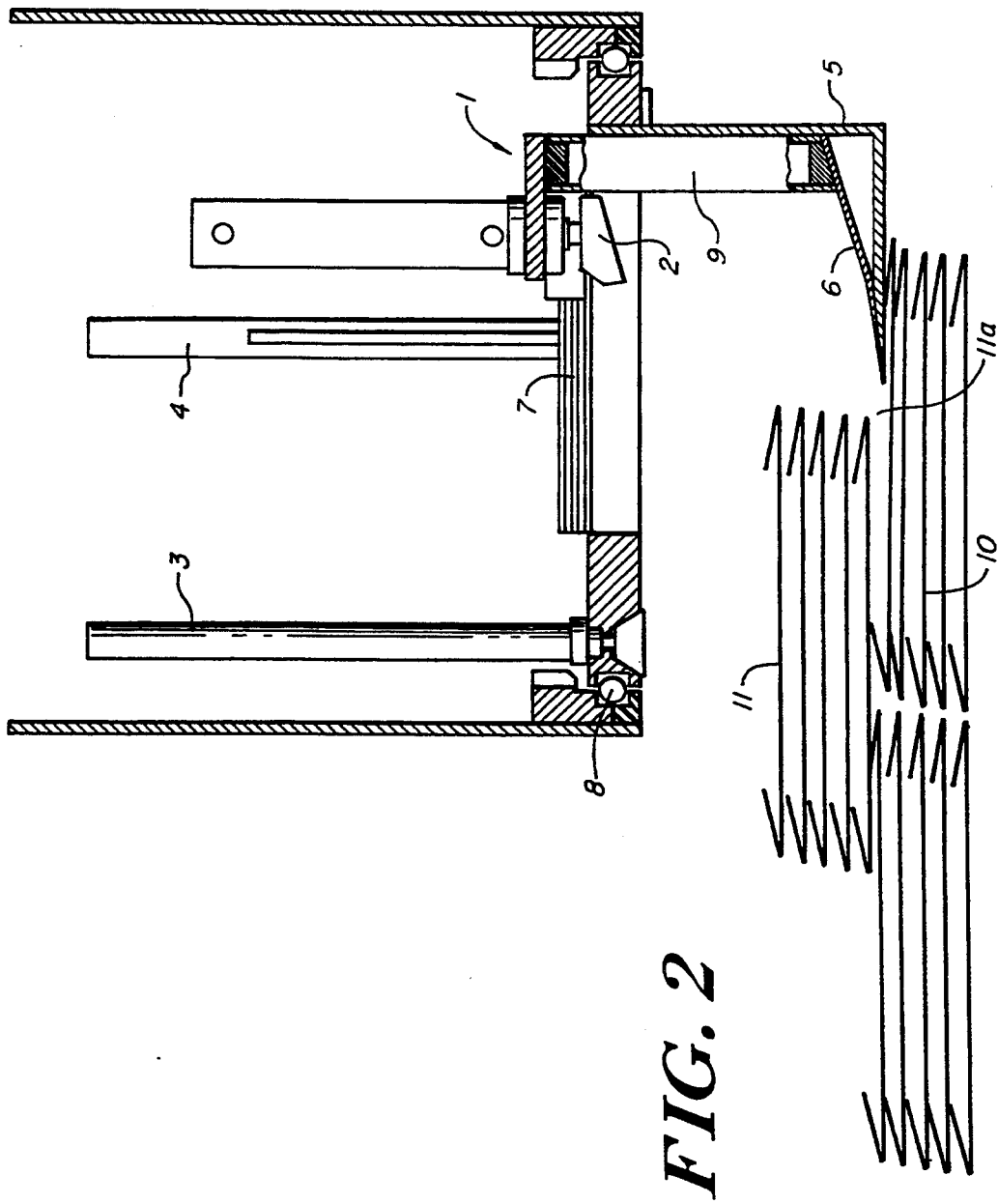
FIG. 2 is a side view of the embodiment of FIG. 1 in which a gripper unit is placed on a lower stack of flat bag parts.

A more detailed representation of the device for lifting a bundle 11 is shown in FIGS. 2 and 3. The bundle 11 to be gripped and its precise gripping point are initially determined by means of sensors, not shown. Gripper unit 1 approaches the gripping position and places the compression device 5 on the partial stack 10. This holds the lower stack 10 in position and creates an engagement gap 11a for the insertion arm 6. Then the hold-down device 3 is extended, thus securing the bundle 11 to be lifted for the gripping process. The extension of the first compression device 3 simultaneously opens engagement gap 11a further. Now insertion arm 6, resting proximate to the second compression device 5 and pretensioned can be slid under bundle 11 to be gripped by movement of the gripper unit 1 along the track 7 in the direction of bundle 11. As soon as bundle 11 has been sufficiently underrun, it is compressed by clamp foot 2 against insertion arm 6. First compression device 3 is then retracted and retainers 4 are extended. The retainers 4 serve to prevent any possible snagging of the insertion arm 6 on protrusions of parts in the lower stack 10, not part of bundle 11 to be depalletted, during the vertical elevation of the entire system. The lifting device with bundle 11 clamped in gripper 1 then travels roughly vertically upward until the retainers 4 lose contact with the stack 10 and have released any possible snags. Then the retainers 4 are retracted.

Figure 9A:
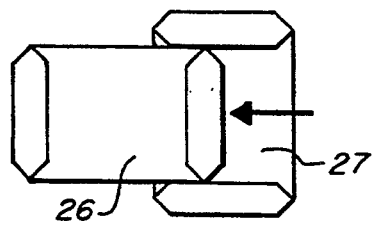
FIG. 9 is a plan view of various arrangements of staggered stacked parts.
Figure 9B:
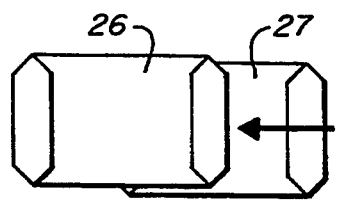
Figure 9C:
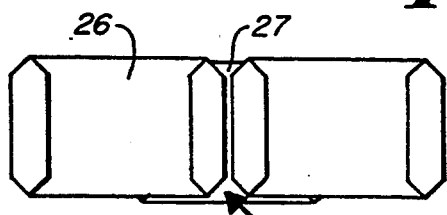

The entire system, during the lifting process that follows, is rotated describing an arc defined about the free end of the gripped bundle 11. This avoids undesired relative movements between the gripped bundle 11 and the stack 10 located beneath which could lead to misalignment of the stack 10. Bundle 11 is then lifted free and, suspended from gripper 1, is transported further to a delivery position. In all of the depalletting and lifting processes using the device according to the invention, it is advantageous for the stacking of the parts to be staggered according to FIG. 9. Bundles 26 to be lifted, underlying stacks 27 which are left in place, and angles of approach for the insertion arm 6, shown by arrows, are illustrated.

The lifting device shown in FIG. 1 is rigidly connected at an outside jacket 25 with a parts handling system, not shown. When the lifting device corresponding to FIG. 2 is placed with retainers 4 on stack 10 by the handling system, the underrunning and clamping means are moved linearly along track 7 by an auxiliary motor while the handling system is at rest until the gripping process is over.

According to another embodiment of the present invention, the gripper unit 1 including the lifting arm and clamp foot 2 is fastened to the handling system without rotational means 8 (the latter is integrated in the handling system), and rests on stack 10 in a starting position corresponding to FIG. 1. Instead of an auxiliary motor moving the lifting arm and clamp foot 2, the handling system acting on jacket 25 then slides these elements under the bundle 11 to be depalletted and thus assumes the function of the auxiliary motor.

These and other examples of the concept of the invention illustrated above are intended by way of example and the actual scope of the invention is to be determined from the following claims.

We claim:

1. A lifting device for manipulating a plurality of flat objects, having a movable support frame, comprising:
   a first compression device having a first axis and comprising a first end and a second end for compressing said plurality of flat objects via extension of said second end along said first axis;
   gripper comprising:
      a second compression device having a second axis parallel to said first axis of said first compression device and having a compression foot extending substantially orthogonal to said second axis of said second compression device toward said first compression device for compressing a portion of said plurality of flat objects, thereby dividing said plurality of flat objects into at least a first and a second discrete group,
      a lifting arm proximate said second compression device and moveable in a direction orthogonal to said second axis of said second compression device along a track mounted on said support frame, comprising a tongue element insertable between said first and said second discrete groups to isolate a stack of objects to be manipulated as a subset of said plurality of flat objects, wherein said tongue element comprises a rigid insertion arm flexibly attached to a mounting element and pretensioned toward said second discrete group of flat objects, and
      a displaceable clamp for exerting compressive force against said first discrete group of flat objects for securing said stack of objects between said clamp and said tongue element; and
   at least one retainer acting along an axis substantially parallel to said first axis, compressing said second discrete group of flat objects,
   said support frame comprising a rotatable mounting point about which said frame rotates after said frame raises sufficiently high to disengage said at least one retainer from said plurality of flat objects, thereby removing said first discrete group of flat objects from said plurality of flat objects.

2. A lifting device for manipulating a plurality of flat objects, having a movable support frame, comprising:
   a first compression device having a first axis for compressing said plurality of flat objects located at a loading position along said first axis;
   a gripper comprising:
      a second compression device having a second axis parallel to said first axis of said first compression device and having a compression foot for compressing a portion of said plurality of flat objects by extension of said second compression device along said second axis, thereby dividing said plurality of flat objects into at least a first and a second discrete group,
      a lifting arm proximate said second compression device and moveably attached to a track mounted on said support frame, said track being substantially parallel to a longitudinal axis of said compression foot, said lifting arm rotatably mounted to said track and comprising a tongue element insertable between said first and said second discrete groups to isolate a stack of objects to be manipulated as a subset of said plurality of flat objects, said tongue element consisting of an insertion arm rigidly joined to a mounting element, and a displaceable clamp for exerting compressive force against said stack of objects for securing said stack of objects between said clamp and said tongue element; and at least one retainer acting along a third axis substantially parallel to said first axis, compressing said second discrete group of flat objects, wherein said support frame secures said isolated stack of flat objects apart from said plurality of flat objects to permit transport of said stack of objects from said loading position to a delivery position.

3. The device of claim 2, wherein said lifting arm is biased toward the second compression device.

* * * * *